Feb. 16, 1954    J. HALLER    2,669,491
SELF-ALIGNING POWDERED METAL BEARING
Filed Feb. 15, 1950
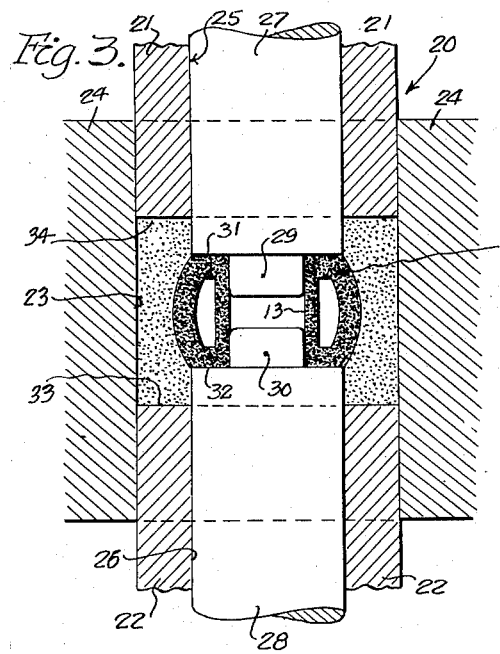
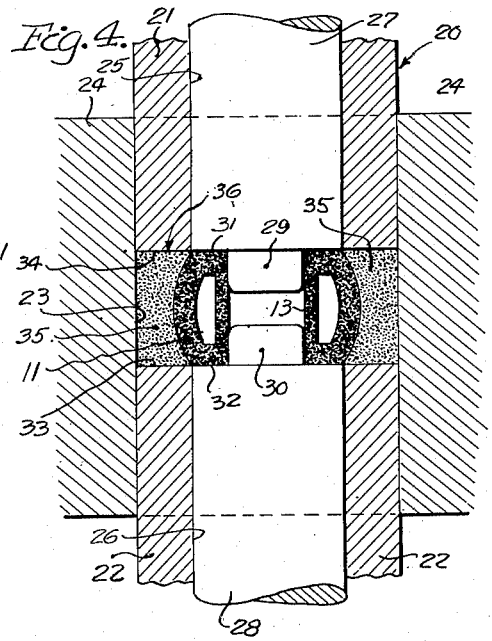
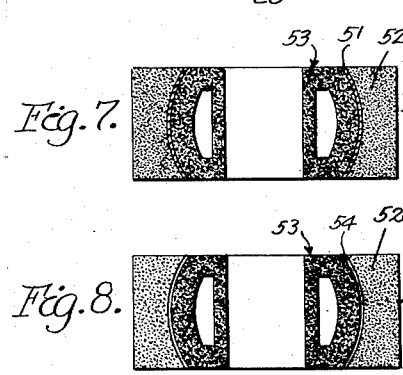
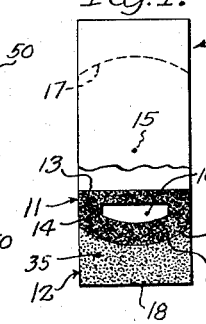
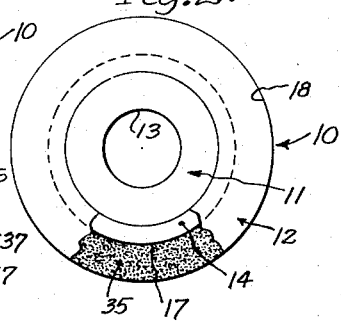
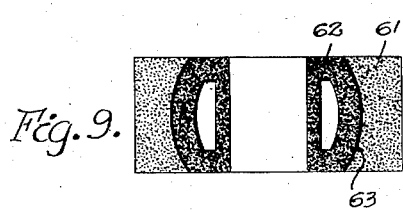
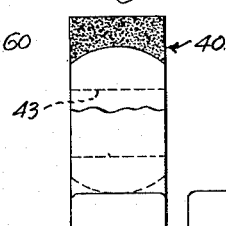
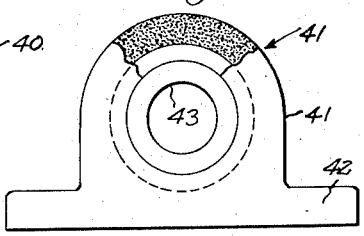
Inventor
John Haller
By Barthel & Bugbee
Attorneys Patented Feb. 16, 1954

2,669,491

UNITED STATES PATENT OFFICE 2,669,491

SELF-ALIGNING POWDERED METAL BEARING

John Haller, Northville, Mich., assignor to Michigan Powdered Metal Products Co., Inc., Northville, Mich., a corporation of Michigan Application February 15, 1950, Serial No. 144,313

4 Claims. (Cl. 308—72)

This invention relates to bearings and, in particular, to self-aligning powdered metal bearings.

One object of this invention is to provide a self-aligning powdered metal bearing, wherein the outer ring or shell is in a single piece and contains the central bearing sleeve or element with a suitable clearance therebetween.

Another object is to provide a self-aligning powdered metal bearing and process of making the same wherein the outer ring or shell is molded firmly against the inner bearing sleeve or element but wherein, during sintering, a suitable clearance is set up therebetween, this clearance being of an accurately predetermined amount.

In the drawings:

Figure 1 is a side elevation, partly in central vertical section, of a self-aligning powdered metal bearing, according to the present invention;

Figure 2 is a front elevation, partly in section, of the bearing shown in Figure 1;

Figure 3 is a central vertical section through the die cavity or mold of a molding press showing the start of the process of molding the outer ring or shell around the central bearing sleeve or element;

Figure 4 is a view similar to Figure 3, but showing the position of the parts at the end of the molding operation;

Figure 5 is a side elevation, partly in section, of a self-aligning powdered metal pillow block bearing produced according to the process of Figures 3 and 4;

Figure 6 is a front elevation, partly in section, of the pillow block bearing shown in Figure 5;

Figure 7 is a central vertical section through a molded self-aligning powdered metal bearing produced according to a modification of the process of the present invention, prior to sintering;

Figure 8 is a view similar to Figure 7, but showing the bearing after sintering; and Figure 9 is a central vertical section through a self-aligning powdered metal bearing produced by a further modification of the process of Figures 3 and 4.

Referring to the drawings in detail, Figures 1 and 2 show a self-aligning powdered metal bearing, generally designated 10, according to one form of the invention and produced by one process according to the invention. The self-aligning bearing 10 consists of a central bearing sleeve or element 11 encircled by an outer bearing ring or shell 12, the members 11 and 12 being tiltable relatively to one another to automatically align the shaft which the bearing 10 rotatably supports. The bearing element 11 is of annular form with a central bore 13 and an outer spherical surface 14 having its center at the point 15 located on the axis of the bore 13. An internal annular oil well 16 is preferably provided in the wall of the bearing element 11. The bearing element 11 is disclosed and claimed in my co-pending application Serial No. 81,274, filed March 14, 1949, now Patent 2,625,452, dated January 13, 1952, for Porous Bearing With Lubricant Reservoir Therein, while the process of making it is disclosed and claimed in my co-pending application Serial No. 70,056, filed January 10, 1949, for Powdered Metal Article and Process of Making the Same.

The outer shell or ring 12 is provided with an internal toroidal cavity 17 surrounding the spherical surface 14 and spaced away from it by a suitable clearance to permit free relative rocking motion between the element 11 and ring 12. The ring 12 has an outer surface 18, such as a cylindrical surface, which is adapted to be secured in a suitable bore or socket in the machine in which the bearing is to be used.

In making the bearing 10 shown in Figures 1 and 2, a suitable molding press, generally designated 20, is provided, such as the molding press shown in my co-pending application Serial No. 780,851, filed October 20, 1947, now Patent 2,608,826, dated Sept. 2, 1952, for Briquetting Machine, but any other suitable molding press may be used. This press, the details of construction of which are beyond the scope of the present invention, includes upper and lower tubular or outer plungers 21 and 22 reciprocating into and out of a bore or die cavity 23 in a die or mold block 24 mounted on the bed of the press. The tubular plungers 21 and 22 are in turn provided with central bores 25 and 26 respectively in which upper and lower central or inner plungers 27 and 28 reciprocate, independently of and relatively to the upper and lower outer or tubular plungers 21 and 22. In order to facilitate holding and lining up the central bearing element or sleeve 11, the upper and lower inner plungers 27 and 28 are optionally provided with reduced diameter pilot portions 29 and 30 surrounded by annular shoulders 31 and 32 respectively adapted to engage the opposite ends of the bearing element 11 while the pilot portions 29 and 30 enter the bore 13 thereof. The upper and lower outer and inner plungers 21, 22 and 27, 28 are reciprocated in any suitable manner, such as by hydraulic motors shown in detail in the above-mentioned co-pending application Ser. No. 780,851.

In the process of producing the self-aligning powdered metal bearing of Figures 1 and 2, a finished central bearing element or sleeve bearing 11 is selected, as disclosed in my above-mentioned co-pending applications. This bearing element is composed of powdered metal, such as powdered iron, containing a small percentage of copper, for example 6 to 7 per cent, and having pores infiltrated with an alloy of suitable composition, such as 85% copper and 15% zinc. This alloy, prior to sintering, was in the form of a ring of the size of the annular oil well or chamber 16 and filling that space. This core was produced in a press similar to the molding press 20 of Figures 3 and 4 by being placed in the die cavity, surrounded by powdered metal such as powdered iron which is thereupon compressed to a suitable density. This assembly is then sintered at a temperature of approximately 2020° F. for approximately one-half hour, during which the core melts and infiltrates into the pores of the bearing element 11, leaving the annular oil well or chamber 16 behind it. At the same time, the infiltration of the alloy into the side walls of the bearing increases the density of the bearing, improves its wearing qualities, and raises the temperature at which the alloy, or the copper constituent thereof, will emerge from the bearing. This increased temperature effect facilitates the carrying out of the process of the present invention.

The finished bearing sleeve or element 11 is placed in the die cavity 23 (Figure 3) upon the annular shoulder 32 of the lower inner plunger 28 which has been raised to a suitable height or level within the die cavity 23. The top surface 33 of the lower outer plunger 22 is also brought up to the desired level for the start of molding operations, which, as shown in Figure 3, is preferably a short distance below the level of the top surface 32 of the inner plunger 28. The reduced diameter pilot portion 30 of the lower inner plunger is caused to enter the bearing bore 13, thereby securely positioning the bearing element 11 and preventing it from slipping. The upper inner plunger 27 is then lowered upon the top of the bearing element 11 (Figure 3) with its pilot portion 29 entering the bore 13 and its bottom surface 31 engaging the top surface of the bearing element 11. The plungers 27 and 28 are selected to be of such diameters that they completely occupy the upper and lower surfaces of the bearing element 11, leaving only the spherical side surface 14 exposed.

The portion of the die cavity around the bearing element 11 is then filled with the powdered metal of which the outer ring 12 is to be composed, for example, powdered iron containing 6 to 7 per cent copper. An expanding metal powder, known as a so-called "growing" powder which expands during sintering, is used for the ring 12 as distinguished from powders which shrink or contract during sintering. Such growing powders are known to the powder metallurgy art and given in standard texts thereon. When the die cavity 23 has been filled to the desired height, the upper outer tubular plunger 21 is moved downward and the lower outer tubular plunger 22 is moved upward until their end surfaces 34 and 33 arrive approximately opposite and on the same level with the surfaces 31 and 32 of the inner plungers 27 and 28 (Figure 2). The powdered metal filling the die cavity 23 is thus compressed into an annular space surrounding the finished central bearing element 11. It then forms an annular mass 35 of unsintered growing powder of powdered metal.

The outer and inner upper plungers 21 and 27 are now retracted upward out of the die cavity or bore 23 and the lower outer and inner plungers 22 and 28 are advanced upward to expel the semi-finished or unsintered bearing, generally designated 26, from the die cavity 23.

The semi-finished bearing 36 is now placed in a sintering oven and the temperature raised to about 1900° F. and sintered at this temperature for approximately one-half hour. Care is taken to avoid raising the sintering temperature to an excessively high degree, in order to prevent the flow of the copper out of the central bearing element 11, this copper being impregnated therein during the previous sintering and infiltration. As previously stated, the copper which has infiltrated the central bearing element 11 in its first sintering will flow out during a subsequent sintering only at a heightened temperature, so that the danger of an outflow of copper from the central bearing element 11 can be easily avoided by carefully controlling the temperature at which the second sintering or sintering of the outer ring powder 35 is carried out.

During the sintering operation, the powdered metal ring portion 35 expands outward more than the central bearing element 11 due to the fact that the outer portion 35 is of a growing powder, resulting in the formation of an annular gap or clearance 37 (Figure 1) between the opposed spherical surfaces 14 and 17 on the outside of the central bearing element 11 and inside of the bearing ring or outer shell 12 respectively. For this reason, the former will rock freely and easily relatively to the latter, thereby bringing about the self-aligning action of the bearing 10.

In the event that the bearing element or sleeve 11 and ring or outer shell 12 are made of powdered bronze instead of powdered iron, the procedure is similar except that a lower sintering temperature must be used since powdered bronze bearings are sintering at approximately 1500° F. The length of time for sintering either bearing depends, of course, upon the size of the bearing, the previously-mentioned time of one-half hour being suitable for a small bearing.

The pillow block self-aligning powdered metal bearing 40 shown in Figures 5 and 6 is produced by the same process as the annular bearing 10 shown in Figures 1 to 4 inc. except that the die cavity 23 has a cross-section corresponding to the outline of the outer or pillow block portion 41, this being offset relatively to the axis of the bearing because of the base portion 42 which is likewise offset. The central portion or bearing element 43 is produced in the same manner as the bearing element 11 previously described and is manipulated in the same way in the molding press 20. The upper and lower outer plungers 21 and 22 are, of course, made with cross sections corresponding to the outline of the pillow block portion 41, the same as the die cavity 23. The process is otherwise substantially the same and hence requires no repetition. The pillow block bearing 40 is, of course, used in locations where it is to be mounted upon a flat surface by the use of its base portion 42 rather than inserted in a bore.

The modified powdered metal bearing 50 of Figure 8 is made in a closely similar manner to the bearing 10 of Figures 1 and 2, and the procedure within the molding press 20 is identical. Prior to inserting the central bearing element 11 in the press, however, it is provided with a coating 51 of a metal or alloy which is infiltratable during sintering into the material of the outer ring portion 52. It will not infiltrate to any great extent into the inner bearing element 53 because this has already been sintered once and accordingly has much less tendency to absorb additional metal. The layer 51 may be deposited by plating or spraying and may consist of the same infiltratable alloy of 85% copper and 15% zinc previously mentioned, assuming that the unsintered outer portion 52 is of powdered iron. The thickness of the layer 51 is determined by the clearance 54 which it is desired to have between the outer and inner bearing portions 52 and 53 (Figure 8).

The inner bearing element 53, coated with the infiltratable metal layer 51, is placed in the molding press 20, as before (Figure 3) and the die cavity 23 filled with powdered iron or other suitable powdered metal particles. Due to the presence of the layer or coating 54, however, it is unnecessary to use a growing powder as before. When the mold charge has been compressed (Figure 4), the article is withdrawn from the press 20 as before and placed in a sintering oven for the second sintering operation. This is carried out, as before, at a temperature sufficiently high to cause the layer metal 51 to infiltrate the pores of the outer shell 52 without setting up an outflow of metal from the pores of the inner bearing element or sleeve 53. The disappearance of the layer metal 51 in this manner during sintering leaves the desired clearance space 54 between the outer and inner bearing members 52 and 53 (Figure 8) and enables free self-aligning rocking motion to occur. The sintering operation, of course, hardens the outer shell or ring 52 at the same time the layer metal 51 is being infiltrated therein. A sintering temperature of approximately 1900° F. for approximately one-half hour is found suitable for a small bearing.

The process of making the powdered metal self-aligning bearing 60 shown in Figure 9 follows a similar procedure as that previously described in connection with Figures 1 to 4 inc. In order to positively insure that no brazing or alloying between the outer and inner bearing elements 61 and 62 can occur during sintering, a layer 63 of a suitable anti-alloying material such as graphite or a graphitic composition is placed upon the outer surface of the inner bearing element or sleeve 62. An expanding or growing powder is preferably used in order to insure an adequate clearance between the elements 61 and 62. During sintering, which is carried out at approximately the same temperature and for approximately the same time periods as described above, the layer 63 prevents flow of copper between the inner bearing element 62 and the outer ring or shell 61, even though the sintering temperature is raised to a higher degree than is employed in the process of Figures 1 to 4 inclusive. Thus, in producing the bearing 60 of Figure 9, less care is needed in maintaining the maximum temperature of the second sintering at or below the critical temperature level which might otherwise cause an outflow of copper from the previously sintered inner bearing element or sleeve 62.

What I claim is:

1. A self-aligning powdered metal bearing comprising a one-piece inner bearing element of powdered metal having a bore therein and a spherical outer bearing surface therearound, and a one-piece outer bearing element of powdered metal having an internal spherical bearing surface therein receiving and encircling said outer surface of said inner bearing element with an annular clearance space therebetween, said outer bearing element being formed of powdered metal of growing powder characteristics.

2. A self-aligning powdered metal bearing comprising a one-piece inner bearing element of powdered metal having a bore therein and a spherical outer bearing surface therearound, and a one-piece outer bearing element of powdered metal having an internal spherical bearing surface therein receiving and encircling said outer surface of said inner bearing element with an annular clearance space therebetween, the adjacent surfaces of said bearing elements within said clearance space being impregnated with a metal dissimilar to the metal of said bearing elements.

3. A self-aligning powdered metal bearing comprising an inner bearing element of powdered metal having a bearing bore therein and a spherical outer surface therearound, and a one-piece outer bearing element of powdered metal having an internal spherical surface therein receiving and encircling said outer surface of said inner bearing element with an annular clearance space therebetween, one of said bearing elements having a layer of anti-alloying material thereon within said clearance space.

4. A self-aligning powdered metal bearing comprising an inner bearing element of powdered metal having a bearing bore therein and a spherical outer surface therearound, and a one-piece outer bearing element of powdered metal having an internal spherical surface therein receiving and encircling said outer surface of said inner bearing element with an annular clearance space therebetween, one of said bearing elements having a layer of graphitic material thereon within said clearance space.

JOHN HALLER.

References Cited in the file of this patent

UNITED STATES PATENTS

| Number | Name | Date |
|---|---|---|
| 1,664,189 | Claus | Mar. 27, 1928 |
| 1,896,939 | Calkins | Feb. 7, 1933 |
| 1,903,483 | Skillman | Apr. 11, 1933 |
| 2,441,294 | Shafer | May 11, 1948 |
| 2,461,765 | Olt | Feb. 15, 1949 |